(12) United States Patent
Groeller (10) Patent No.: US 8,021,190 B2
(45) Date of Patent: Sep. 20, 2011

(54) BATTERY CABLE WITH PROVISIONS FOR INTEGRAL CIRCUIT PROTECTION

(75) Inventor: Charles J. Groeller, Orefield, PA (US)

(73) Assignee: Mack Trucks, Inc., Greensboro, NC (US)

( * ) Notice: Subject to any disclaimer, the term of this patent is extended or adjusted under 35 U.S.C. 154(b) by 917 days.

(21) Appl. No.: 10/571,144

(22) PCT Filed: Sep. 17, 2004

(86) PCT No.: PCT/US2004/030537
§ 371 (c)(1),
(2), (4) Date: Nov. 26, 2008

(87) PCT Pub. No.: WO2005/029646
PCT Pub. Date: Mar. 31, 2005

(65) Prior Publication Data
US 2011/0136385 A1    Jun. 9, 2011

Related U.S. Application Data

(60) Provisional application No. 60/503,455, filed on Sep. 17, 2003.

(51) Int. Cl.
H01R 13/68    (2011.01)

(52) U.S. Cl. .................... 439/620.26; 439/522

(58) Field of Classification Search .......... 439/522, 439/521, 762–764, 620.26, 500
See application file for complete search history.

(56) References Cited

U.S. PATENT DOCUMENTS 5,645,448 A    7/1997    Hill
5,882,213 A *    3/1999    Witek et al. .............. 439/76.2

* cited by examiner

Primary Examiner — Javaid Nasri
(74) Attorney, Agent, or Firm — Martin Farrell; Michael Pruden (57) ABSTRACT

A battery cable circuit protection device and circuit for preventing fluctuations in voltage from a supply battery is provided. The device includes a terminal base having a battery cable lug member adapted for mounting to and making an electrical connection with a battery post of the battery. A battery cable mounting structure is fixedly connected to the terminal base for detachably connecting the terminal base to a battery cable. The battery cable supplies a vehicle starter motor with electrical energy. A first fuse mount supported by the terminal base provides electrical interconnection to the battery post. A second fuse mount supported by the terminal base provides electrical energy to vehicle electrical systems other than the vehicle starter motor. The first and second fuse mounts are adapted for detachable a connection to a fuse which provides electrical interconnection between the first and second fuse mounts.

18 Claims, 8 Drawing Sheets

BATTERY CABLE WITH PROVISIONS FOR INTEGRAL CIRCUIT PROTECTION

CROSS-REFERENCE TO RELATED APPLICATIONS

This application is a National Phase of International Application Serial No. PCT/US2004/030537, filed 17 Sep. 2004, which claims benefit of U.S. Provisional Application Ser. No. 60/503,455, filed 17 Sep. 2003.

BACKGROUND OF THE INVENTION

1. Field of the Invention

The present invention relates generally to a battery cable circuit protection device and, more particularly, to a battery cable with provisions for integral circuit protection.

2. Description of the Background Art

Generally, a battery is mounted inside a vehicle as a power source of electrical power, and electronic, integrated circuits are designed to drive on voltage from the battery and through the vehicle's electric system. As used in this application, the term "vehicle" refers to any motor vehicle including, but not limited to, a car, truck, van, tractor trailer, bus, etc.

Electric system distribution lines may be affected by sharp voltage fluctuations due to sharp changes in the input current to components of the vehicle (e.g., air conditioner, lights, windshield wipers, etc.). The integrated circuits for the various electric loads may suffer damage where overvoltages or undervoltages appear at the power supply.

To obviate this problem, a prior approach consists of using integrated circuits that can withstand such voltage fluctuations. Consequently, the manufacture of these circuit types (e.g., components and processing) is expensive.

Another prior approach consists of connecting, between the integrated circuit and ground, a device which provides protection against the voltage fluctuations. One such prior art system is disclosed in U.S. Pat. No. 5,645,448 to Hill. As illustrated in FIG. 1, a battery connecting module 10 provides for electrical interconnection between a battery 70, an alternator cable 74 connected to an alternator (not shown), a starter cable 76 connected to a starter motor (not shown), and a fuse box cable 78 connected to a fuse box (not shown). A main fuse 80 can be electrically connected between the alternator cable 74 and the distributed electrical systems of the vehicle. Such system, however, also aggravates the manufacturing costs as well as add to the cost of assembling the electric system to a vehicle (e.g., costs of additional parts).

Thus, there exists a need in the art for a power conditioning between the main power source and electrical devices to either eliminate and/or to adequately control undesired power conditions.

SUMMARY OF THE INVENTION

The present invention solves the existing need by providing a battery cable with provisions for integral circuit protection, which has structural and performance characteristics as to adequately guard from voltage fluctuations in the battery supply.

According to one preferred embodiment of the present invention, a battery cable circuit protection device for preventing fluctuations in voltage from a supply battery is provided. The device includes a terminal base having a battery cable lug member adapted for mounting to and making an electrical connection with a battery post of the battery. A battery cable mounting structure is fixedly connected to the terminal base for detachably connecting the terminal base to a battery cable. The battery cable supplies a vehicle starter motor with electrical energy. A first fuse mount supported by the terminal base provides electrical interconnection to the battery post. A second fuse mount supported by the terminal base provides electrical energy to vehicle electrical systems other than the vehicle starter motor. The first and second fuse mounts are adapted for detachable connection to a fuse which provides electrical interconnection between the first and second fuse mounts.

According to another embodiment of the present intention, a circuit for preventing fluctuations in voltage from a supply battery comprising the battery cable circuit protection device of the present invention is provided.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements, and no discussion will be given. A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1A:
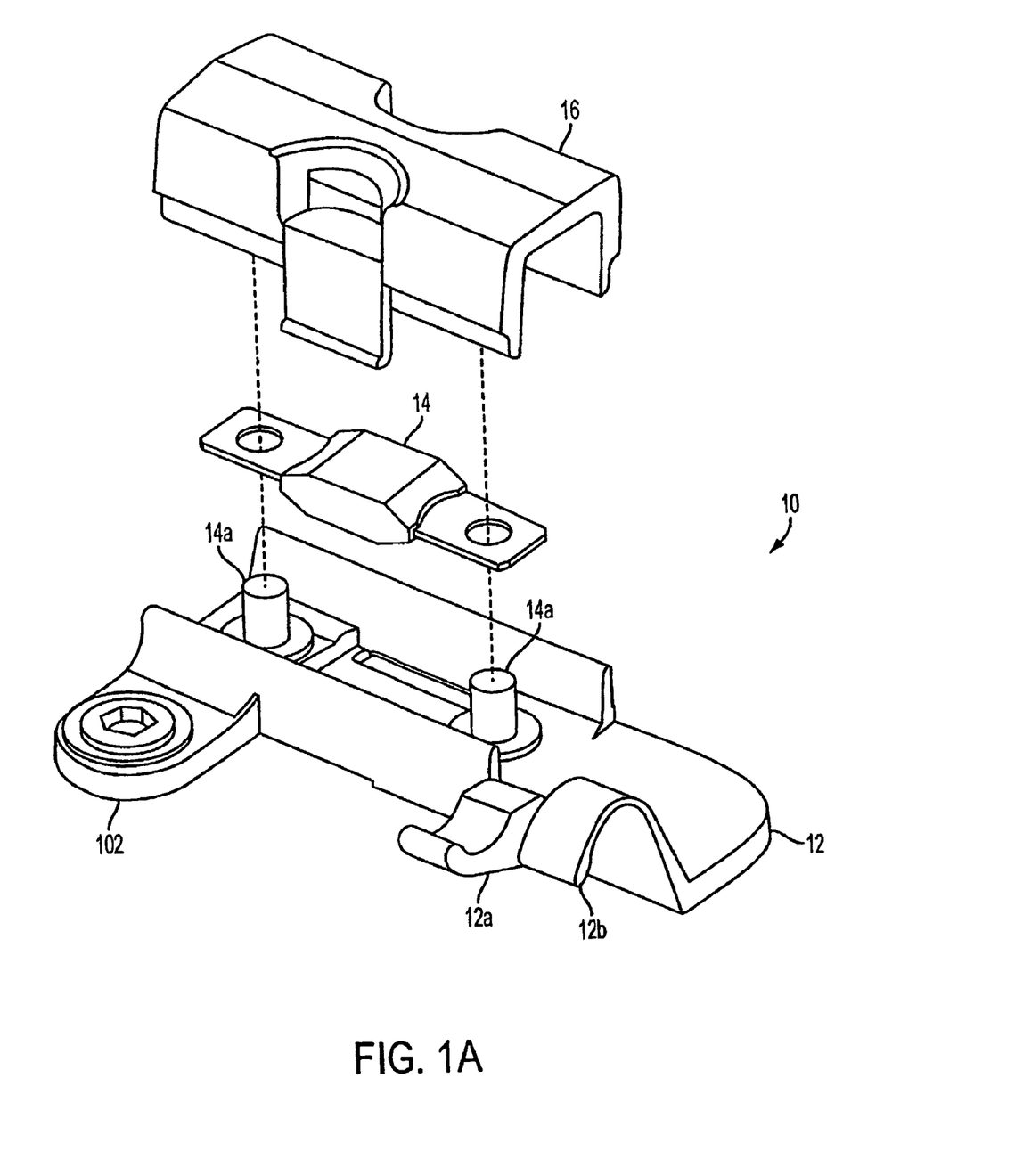
FIGS. 1A and 1B are plan views of a battery cable circuit protection device according to an exemplary embodiment of the present invention.
Figure 1B:
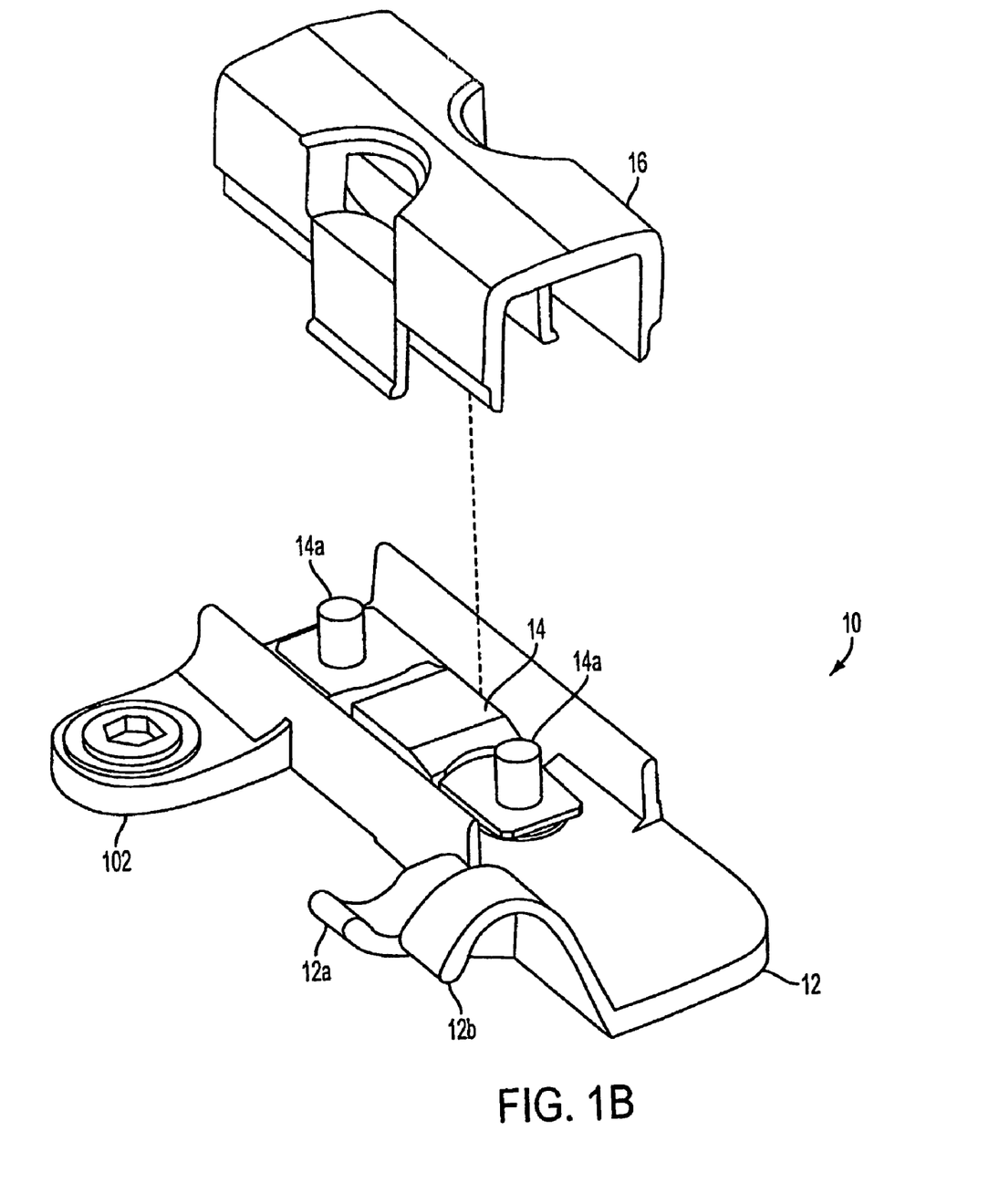

FIGS. 1A and 1B are plan views of a battery cable circuit protection device according to an exemplary embodiment of the present invention. Referring to FIGS. 1A and 1B, the battery cable circuit protection device 10 comprises a terminal base 12, a high-current main fuse 14, and a fuse cover 16. The battery cable circuit protection device 10 of the exemplary embodiment adequately protects the battery supply from voltage fluctuations (e.g., overvoltages or undervoltages).

Figure 1C:
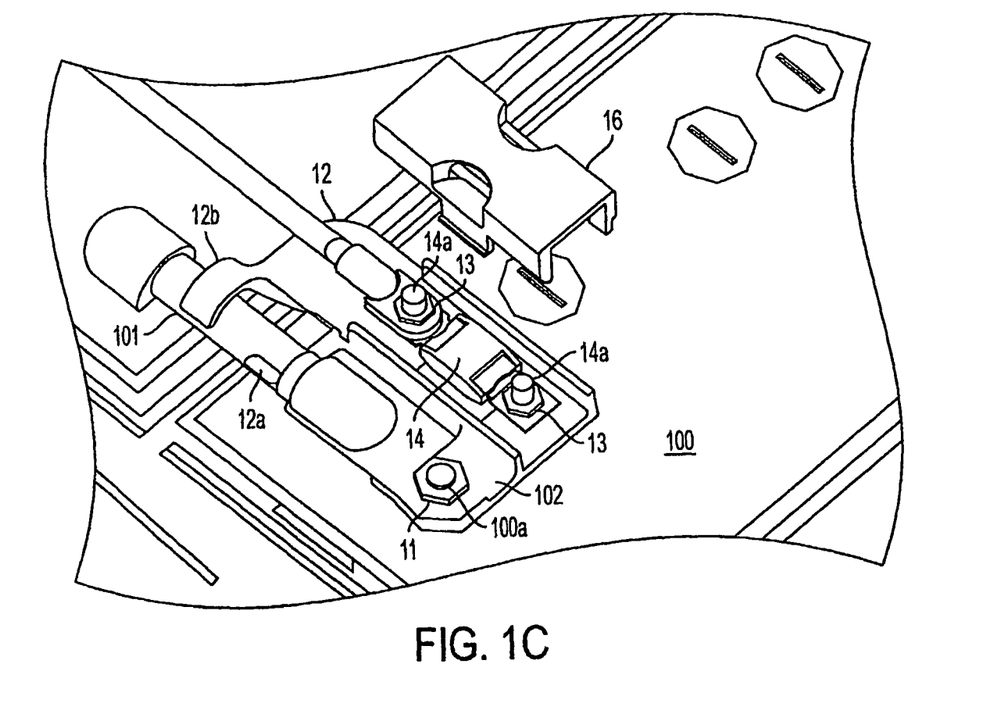
FIG. 1C illustrates the battery cable circuit protection device according to an exemplary embodiment of the present invention being mounted on a battery.

The terminal base 12 has a battery cable lug or post 102 preferably adapted for mounting to a studded battery post 100a of a battery 100, as illustrated in FIG. 1C. FIG. 1C shows the battery cable circuit protection device 10 being mounted on the battery 100. It will be appreciated by those skilled in the art that the battery cable post 102 can also be mounted to other battery terminals, such as a SAE taper post battery terminal, etc. The battery post 100a is secured to the battery cable post 102 via a nut 11.

The terminal base 12 also has battery mounting legs 12a, 12b for securing a battery cable 101 (FIG. 1C) of the battery 100. The battery mounting legs 12a, 12b prevent torsional twisting and loosening of the battery cable 101. The battery cable post 102 and the battery mounting legs 12a, 12b provide electrical interconnection between the battery 100 and a starter motor (not shown). For example, the starter cable connected to the starter motor can be secured to the battery cable post 102.

The battery cable 101 can be attached through the battery mounting legs 12a, 12b of the terminal base 12 without the use of tools. For example, if the terminal base 12 is slightly rotated (i.e., counterclockwise), the battery cable 101 can be easily inserted through the battery mounting legs 12a, 12b. The terminal base 12 should be rotated back to the same plane as the battery cable 101 (i.e., clockwise).

Further, the terminal base 12 has a pair of threaded studs 14a for accommodating the main fuse 14. The main fuse 14 can be secured to the terminal base 12 via nuts 13 (FIG. 1C). The fuse 14 is the main feed and supplies all the electrical energy to the electrical systems/components of a vehicle. For example, the alternator cable connected to an alternator (not shown) can be placed over a threaded stud 14a in addition to the main fuse 14, and secured by a nut 13. The main fuse 14 is enclosed by a fuse cover 16. Preferably, the fuse cover 16 can be snapped onto the terminal base 12.

Figure 2:
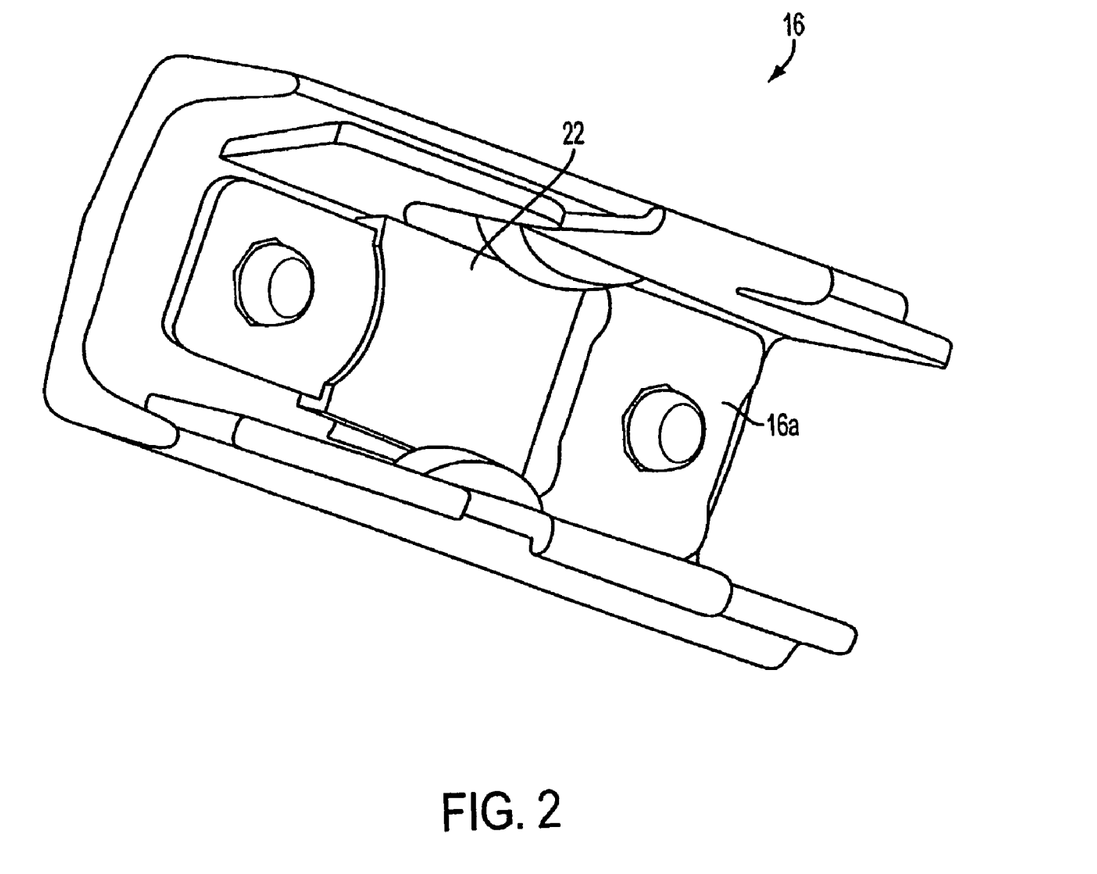
FIG. 2 is the interior surface of the fuse cover of the battery cable circuit protection device according to the present invention.

The fuse cover 16 may have a spare fuse 22 detachably affixed to the interior surface 16a of the fuse cover 16 by friction fit or other means, as illustrated in FIG. 2.

The main fuse 14 provides a master circuit protector for providing recharging protection by protecting in the event of overtemperature conditions, providing discharging protection by protecting in the event of overcurrent conditions, etc.

In the present invention, the battery to starter cable remains attached to the battery cable post 102 and has no intermediary straps or connections. The main fuse 14 and the battery cable 101 both mount to the true battery stud 100a of the battery 100, using only the hardware supplied with the standard battery cable to secure both elements. Accordingly, any additional voltage drop in the starting/cranking circuit is eliminated.

Figure 3A:
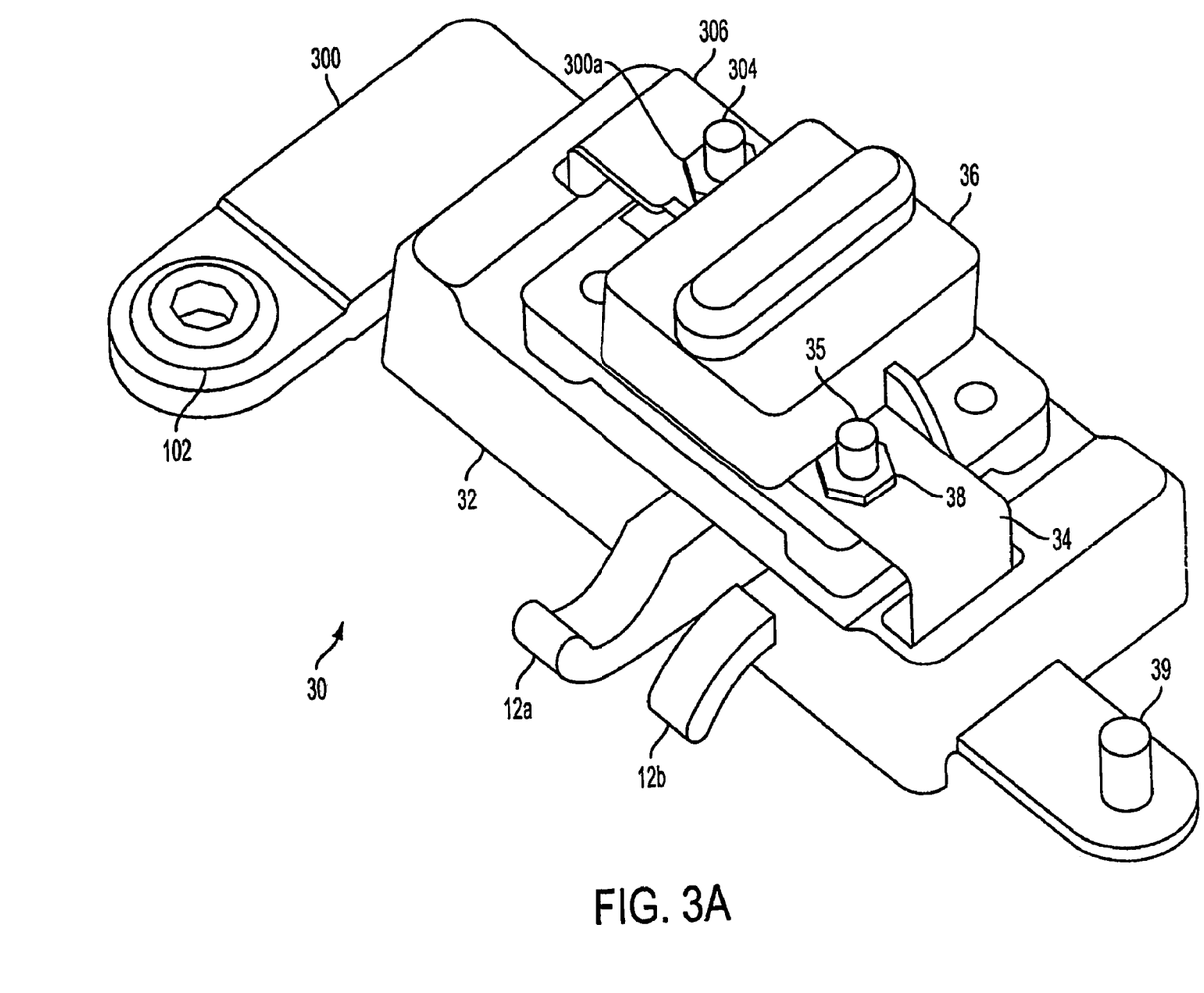
FIGS. 3A and 3B are plan views of a battery cable circuit protection device according to another embodiment of the present invention.
Figure 3B:
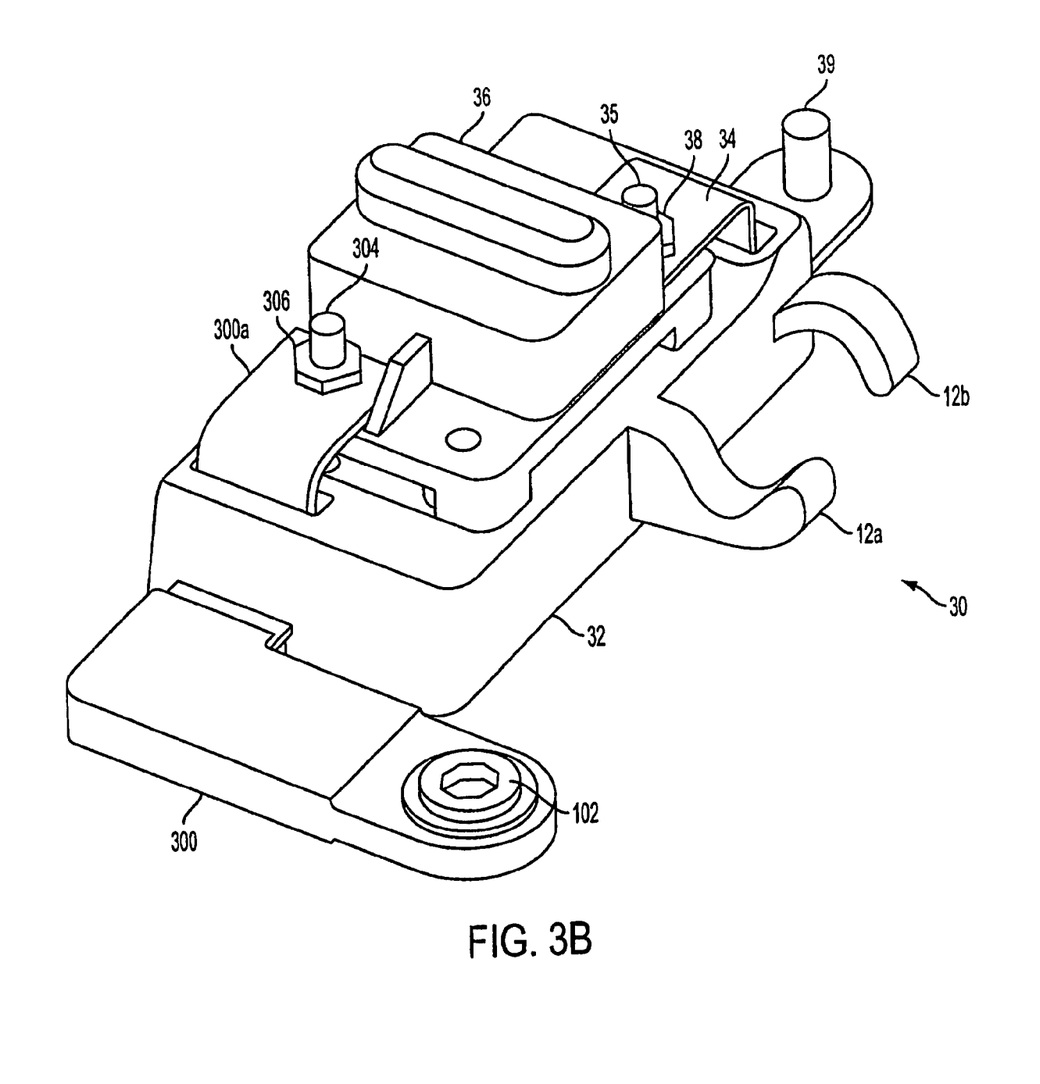
Figure 3C:
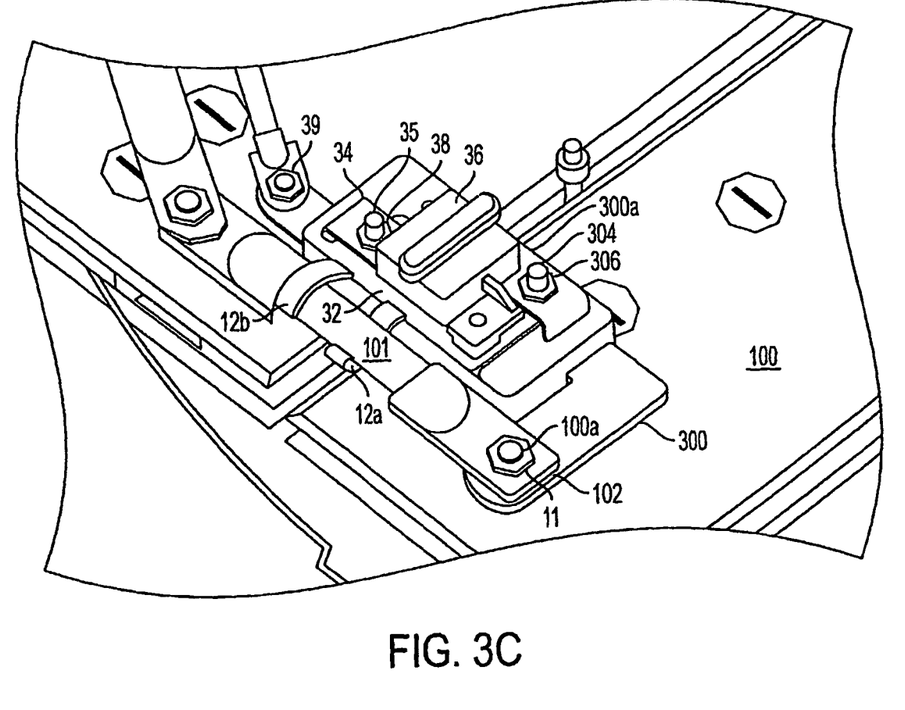
FIG. 3C illustrates the battery cable circuit protection device according to another embodiment of the present invention being mounted on a battery.

FIGS. 3A and 3B are plan views of a battery cable circuit protection device according to another embodiment of the present invention, and FIG. 3C illustrates the battery cable circuit protection device being mounted on a battery. Referring to FIGS. 3A-3C, the battery cable circuit protection device 30 comprises a terminal base 32, a high-current main fuse 14, and a fuse cover 36.

The terminal base 32 includes an elongated plate 300 having a battery cable lug or post 102 disposed at the end portion of the plate 300. The elongated plate 300 further includes a connecting plate 300a that is affixed to the terminal base 32 via a threaded stud 304 and a nut 306. A second connecting plate 34 is mounted to the battery cable circuit protection device 30 via a threaded stud 35 and a nut 38. The second connecting plate 34 can be connected to other electrical systems/components via threaded stud 39.

Similar to the embodiment illustrated in FIGS. 1A-1C, a cover 36 encloses the main fuse 18. Although not shown in the drawings for convenience, the fuse 18 is disposed underneath the cover 36. A secondary spare fuse can also be affixed to the interior surface of the fuse cover 36.

Figure 4A:
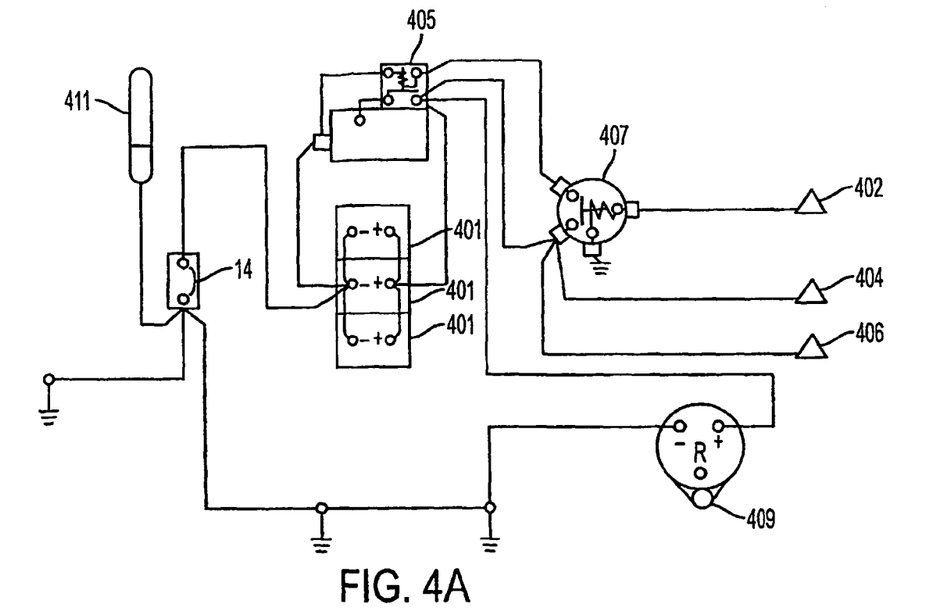
FIGS. 4A and 4B are schematic circuit diagrams of the battery cable circuit protection device according to the present invention in exemplary circuit configurations.
Figure 4B:
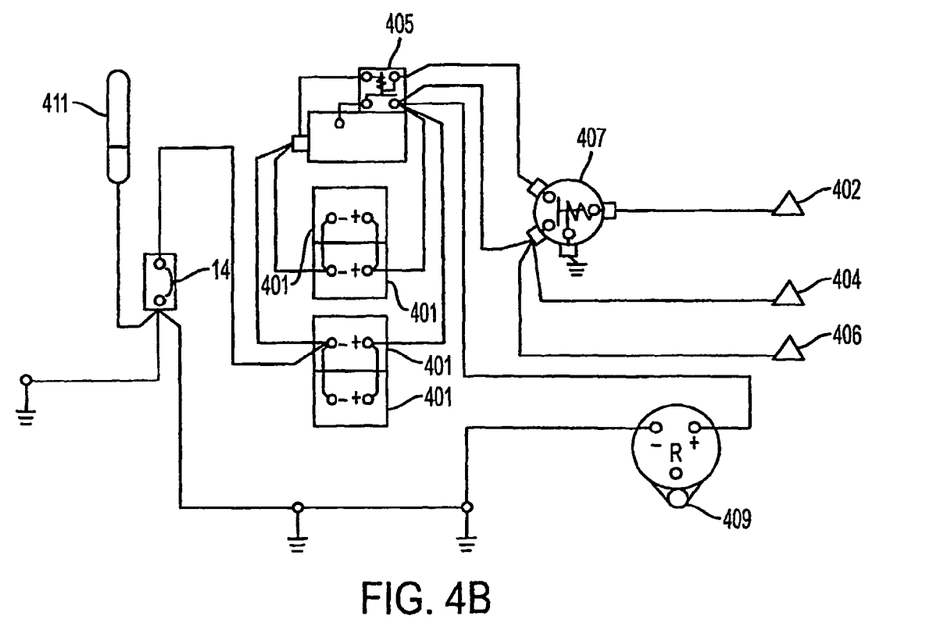

FIGS. 4A and 4B are schematic circuit diagrams of the battery cable circuit protection device according to the present invention in exemplary circuit configurations. FIG. 4A shows three batteries 401 in a box, and FIG. 4B shows four batteries 401 in two boxes (e.g., two batteries per box). Referring to FIGS. 4A and 4B, battery cables of the batteries 401 are in parallel with the main fuse or circuit breaker 14. The batteries 401 are the primary source and supplies electrical energy only to the starter motor 405. The starter motor 405 starts (via a starter relay 407), for example, the ignition via ignition switch 402, provides power to cab 404, EPDM 406, etc.

The circuit breaker 14 is the main feed and supplies electrical energy to the other electrical systems/components of the vehicle, such as, for example, an alternator 409. Each electrical system is grounded 411 to prevent electrical shock. The circuit breaker 14 further provides a master circuit protector.

The battery cable circuit protection device of the present invention has a major advantage in that it protects against possible overvoltages (and undervoltages) in the supply from the battery to which it is connected, in addition to protecting the electric loads driven by it. Further, the battery cable circuit protection device of the present invention is structurally quite simple and implementable as an integrated circuit for a low manufacturing cost.

The foregoing has described the principles, embodiments, and modes of operation of the present invention. However, the invention should not be construed as being limited to the particular embodiments described above, as they should be regarded as being illustrative and not as restrictive. It should be appreciated that variations may be made in those embodiments by those skilled in the art without departing from the scope of the present invention.

While a preferred embodiment of the present invention has been described above, it should be understood that it has been presented by way of example only, and not limitation. Thus, the breadth and scope of the present invention should not be limited by the above described exemplary embodiment.

Obviously, numerous modifications and variations of the present invention are possible in light of the above teachings. It is therefore to be understood that the invention may be practiced otherwise than as specifically described herein.

What is claimed is:

1. A battery cable circuit protection device for preventing fluctuations in voltage from a supply battery of a vehicle, comprising:

a terminal base having a battery cable lug member adapted for mounting to and making an electrical connection with a battery post of the battery;

a battery cable mounting structure fixedly connected to said terminal base, for detachably securing said terminal base to a battery cable, which battery cable supplies a vehicle starter motor with electrical energy, including mutually spaced first and second battery cable mounting legs extending from the terminal base for engagement with a battery cable from opposite sides, the mounting legs defining with the battery cable lug member a line along which a battery cable is secured;

a first fuse mount supported by said terminal base and providing electrical interconnection to said battery post; and a second fuse mount supported by said terminal base for providing electrical energy to vehicle electrical systems other than said vehicle starter motor;

wherein said first and second fuse mounts are adapted for detachable connection to a fuse which provides electrical interconnection between said first and second fuse mounts.

2. The device of claim 1, wherein said first and second battery cable mounting legs define an entry so that said terminal base can be attached to or detached from the battery cable by at least partial rotation of said terminal base longitudinally with respect to the battery cable for respectively engaging or disengaging said first and second battery cable mounting legs from the battery cable.

3. The device of claim 1, further comprising a fuse cover enclosing said main fuse.

4. The device of claim 3, wherein a spare fuse is detachably affixed to the interior surface of said fuse cover.

5. The device of claim 1, wherein the battery post is a studded battery post.

6. A circuit for preventing fluctuations in voltage from a supply battery comprising the battery cable circuit protection device of claim 1.

7. A battery cable circuit protection device for preventing fluctuations in voltage from a supply battery of a vehicle, comprising:
 a terminal base having a battery cable lug member adapted for mounting to and making an electrical connection with a battery post of the battery;
 a battery cable mounting structure fixedly connected to said terminal base, for detachably securing said terminal base to a battery cable, which battery cable supplies a vehicle starter motor with electrical energy, said battery cable mounting structure including mutually spaced first and second battery cable mounting legs extending from the terminal base for engagement with a battery cable from opposite sides, the mounting legs defining with the battery cable lug member a line along which a battery cable is secured;
 a first fuse mount supported by said terminal base and providing electrical interconnection to said battery post;
 a second fuse mount supported by said terminal base for providing electrical energy to vehicle electrical systems other than said vehicle starter motor;
 wherein said first and second fuse mounts are adapted for detachable connection to a fuse which provides electrical interconnection between said first and second fuse mounts; and,
 further comprising a device for attaching a vehicle starter cable to said battery post with no intermediary straps or connections.

8. The device of claim 7, wherein said first and second battery cable mounting legs define an entry so that said terminal base can be attached to or detached from the battery cable by at least partial rotation of said terminal base longitudinally with respect to the battery cable for respectively engaging or disengaging said first and second battery cable mounting legs from the battery cable.

9. The device of claim 7, further comprising a fuse cover enclosing said main fuse.

10. The device of claim 7, wherein a spare fuse is detachably affixed to the interior surface of said fuse cover.

11. The device of claim 7, wherein the battery post is a studded battery post.

12. A circuit for preventing fluctuations in voltage from a supply batter comprising the battery cable circuit protection device of claim 7.

13. A battery cable circuit protection device for preventing fluctuations in voltage from a supply battery of a vehicle, comprising:
 a terminal base having a battery cable lug member adapted for mounting to and making an electrical connection with a battery post of the battery;
 a battery cable mounting structure fixedly connected to said terminal base, for detachably securing said terminal base to a battery cable, which battery cable supplies a vehicle starter motor with electrical energy, wherein said battery cable mounting structure comprises first and second battery cable mounting legs extending from the terminal base on opposite sides laterally of a battery cable mounting space, said first and second battery cable mounting legs being spaced apart longitudinally with respect to the battery cable mounting space, so that said terminal base can be attached to or detached from the battery cable by at least partial rotation of said terminal base longitudinally with respect to the battery cable mounting space for respectively engaging or disengaging said battery cable mounting legs from the battery cable;
 a first fuse mount supported by said terminal base and providing electrical interconnection to said battery post; and
 a second fuse mount supported by said terminal base for providing electrical energy to vehicle electrical systems other than said vehicle starter motor;
 wherein said first and second fuse mounts are adapted for detachable connection to a fuse which provides electrical interconnection between said first and second fuse mounts.

14. The device of claim 13, further comprising a fuse cover enclosing said main fuse.

15. The device of claim 14, wherein a spare fuse is detachably affixed to the interior surface of said fuse cover.

16. The device of claim 13, wherein the battery post is a studded battery post.

17. The device of claim 13, further comprising a device for attaching a vehicle starter cable to said battery post with no intermediary straps or connections.

18. A circuit for preventing fluctuations in voltage from a supply batter comprising the battery cable circuit protection device of claim 13.

* * * * *